(12) United States Patent
Panda et al.

(10) Patent No.: US 8,814,149 B2
(45) Date of Patent: Aug. 26, 2014

(54) HUMIDITY GENERATOR

(75) Inventors: Nabin C. Panda, Signal Hill, CA (US);
Carl W. Townsend, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 835 days.

(21) Appl. No.: 13/032,890

(22) Filed: Feb. 23, 2011

(65) Prior Publication Data

US 2012/0211907 A1 Aug. 23, 2012

(51) Int. Cl.
*B01F 3/04* (2006.01)
*F24F 6/14* (2006.01)
*G05D 22/02* (2006.01)
*F24F 11/00* (2006.01)

(52) U.S. Cl.
CPC .............. *F24F 11/0008* (2013.01); *F24F 6/14* (2013.01); *Y02B 30/545* (2013.01); *G05D 22/02* (2013.01); *F24F 11/0012* (2013.01); *F24F 11/0015* (2013.01)
USPC ............ 261/128; 261/130; 261/131; 261/137

(58) Field of Classification Search
CPC ..... F24F 6/14; F24F 11/0008; F24F 11/0012; F24F 11/0015; G05D 22/02; Y02B 30/545
USPC ................................. 261/128, 130, 131, 137
See application file for complete search history.

(56) References Cited

U.S. PATENT DOCUMENTS

| | | | | | |
|---|---|---|---|---|---|
| 4,494,596 | A | * | 1/1985 | Bradshaw | 165/101 |
| 5,056,547 | A | * | 10/1991 | Brownawell | 137/3 |
| 5,364,024 | A | * | 11/1994 | Lin | 236/44 C |
| 5,974,815 | A | * | 11/1999 | Hwang et al. | 62/176.4 |
| 5,984,002 | A | * | 11/1999 | Kido et al. | 165/228 |
| 5,988,003 | A | | 11/1999 | Zuk | |
| 7,048,435 | B2 | * | 5/2006 | Shdaimah et al. | 374/14 |
| 7,395,673 | B2 | * | 7/2008 | Mitter | 62/176.1 |
| 7,685,829 | B2 | * | 3/2010 | Mueller et al. | 62/92 |
| 2010/0072291 | A1 | * | 3/2010 | Matsubara | 236/44 C |

OTHER PUBLICATIONS

Keenan, Keyes, Hill and Moore; Steam Tables (English Units), Table 1, Saturation: Tempuratures; Wiley, 1969.
Weast et al.; Handbook of Chemistry and Physics CRC press, 67th Edition; 1987.

* cited by examiner

*Primary Examiner* — Charles Bushey
(74) *Attorney, Agent, or Firm* — Burns & Levinson LLP; Joseph P. Maraia

(57) ABSTRACT

A humidity generator and method for setting operating parameters of the humidity generator to controllably generate humidity levels below 100% and greater than 100%.

11 Claims, 3 Drawing Sheets

HUMIDITY GENERATOR

FIELD OF THE INVENTION

The currently described invention relates to humidity generators and methods for generating humidity in an airflow.

BACKGROUND

Humidity generators are used to expose a specimen to a variety of humidity conditions to simulate anticipated environmental conditions to which the specimen will be exposed in operation. Conventional humidity generators are only capable of controllably creating humidity levels up to about 99% humidity.

A need therefore exists for improved systems and methods for generating humidity in an airflow.

SUMMARY

Embodiments include various humidity generator configurations and methods for setting operating parameters of humidity generators to controllably generate humidity levels below 100% and greater than 100%, with a wide range of moisture content and over a wide range of temperatures.

One embodiment is a method for determining operating parameters for a humidity generator to generate humidity levels in an airflow. The method includes determining target density of an output airflow based on target output airflow temperature and target output airflow pressure. The method also includes determining target relative humidity of the output airflow to achieve the target moisture content for the output airflow based on atmospheric pressure and ambient temperature outside the humidity chamber, and target density of the output airflow. The method also includes determining an amount of water to be provided to an atomizing nozzle of the humidity generator based on 1) target moisture content for the output airflow, 2) target flow rate for the output airflow, 3) the target relative humidity of the output airflow, and 4) relative humidity of incoming air to the humidity generator. The method also includes determining enthalpy required to evaporate water at the target output airflow temperature. The method also includes determining power required to evaporate the water based on the enthalpy. The method also includes determining heat required to achieve the target output airflow temperature based on 1) the target output airflow temperature, 2) the temperature of the supply air to the humidity generator; 3) target volumetric flow rate, and 4) heat capacity of air. The method also includes determining total heat required based on 1) the heat required to achieve the target output airflow temperature and 2) the power required to evaporate the water based on the enthalpy. The method also includes determining target atomizer nozzle air temperature for air provided to the atomizer nozzle of the humidity generator based on 1) the total heat required, 2) target flow rate for the output airflow, 3) the heat capacity of air, and 4) the temperature of the supply air to the humidity generator. The method also includes determining target air pressure to be supplied to the atomizer nozzle based on the target flow rate for the output airflow.

In some embodiments, the method includes heating or cooling the nozzle air prior to entering the atomizer nozzle of the humidity generator to the target atomizer nozzle air temperature. In some embodiments, the method includes specifying the target moisture content for the output airflow, the target temperature for an output airflow, the target flow rate for the output airflow, the relative humidity of incoming air to the humidity generator, and the temperature of the incoming air to the humidity generator.

In some embodiments, humidity levels are generated at levels greater than 100% in the airflow. In some embodiments, humidity levels are generated at levels less than 100% in the airflow. In some embodiments, the method includes calibrating operation of the humidity generator based on a humidity signal measured during operation at conditions less than 100% humidity to improve accuracy during operation at conditions above 100% humidity.

Another embodiment is a humidity generator for generating humidity levels in an airflow. The humidity generator includes a chamber and a first air supply for providing an airflow to the chamber. The humidity generator also includes an atomizing nozzle in the chamber comprising first and second inputs. The humidity generator also includes a second air supply comprising an output coupled to the first input of the atomizing nozzle. The humidity generator also includes a water storage tank comprising a first output coupled to the second input of the atomizing nozzle, and a second output coupled to the chamber for equalizing pressure between the chamber and the water storage tank. The humidity generator also includes a control module to vary output properties of the first air supply, second air supply, and the water storage tank, wherein the control module includes a processor including a computer program product that includes instructions being operable to determine target density of an output airflow based on target output airflow temperature and target output airflow pressure; determine target relative humidity of the output airflow to achieve the target moisture content for the output airflow based on atmospheric pressure and ambient temperature outside the humidity chamber, and target density of the output airflow; determine an amount of water to be provided to an atomizing nozzle of the humidity generator from the water storage tank based on 1) target moisture content for the output airflow, 2) target flow rate for the output airflow, 3) the target relative humidity of the output airflow, and 4) relative humidity of incoming air to the humidity generator; determine enthalpy required to evaporate water at the target output airflow temperature; determine power required to evaporate the water based on the enthalpy; determine heat required to achieve the target output airflow temperature based on 1) the target output airflow temperature, 2) the temperature of the supply air to the humidity generator; 3) target volumetric flow rate, and 4) heat capacity of air; determine total heat required based on 1) the heat required to achieve the target output airflow temperature and 2) the power required to evaporate the water based on the enthalpy; determine target atomizer nozzle air temperature for air provided to the atomizer nozzle of the humidity generator based on 1) the total heat required, 2) target flow rate for the output airflow, 3) the heat capacity of air, and 4) the temperature of the supply air to the humidity generator; and determine target air pressure to be supplied to the atomizer nozzle based on the target flow rate for the output airflow.

In some embodiments, the water storage tank stores deionized water, distilled water, or a combination of both. In some embodiments, the humidity generator generates humidity levels at levels greater than 100% in the airflow. In some embodiments, the humidity generator generates humidity levels are generated at levels less than 100% in the airflow. In some embodiments, the humidity generator includes a humidity sensor that generates a humidity signal measured during operation at conditions less than 100% humidity, wherein the humidity sensor provide provides the humidity signal to the control module to improve accuracy during operation at conditions above 100% humidity.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings.

DETAILED DESCRIPTION OF ILLUSTRATIVE EMBODIMENTS

Figure 1:
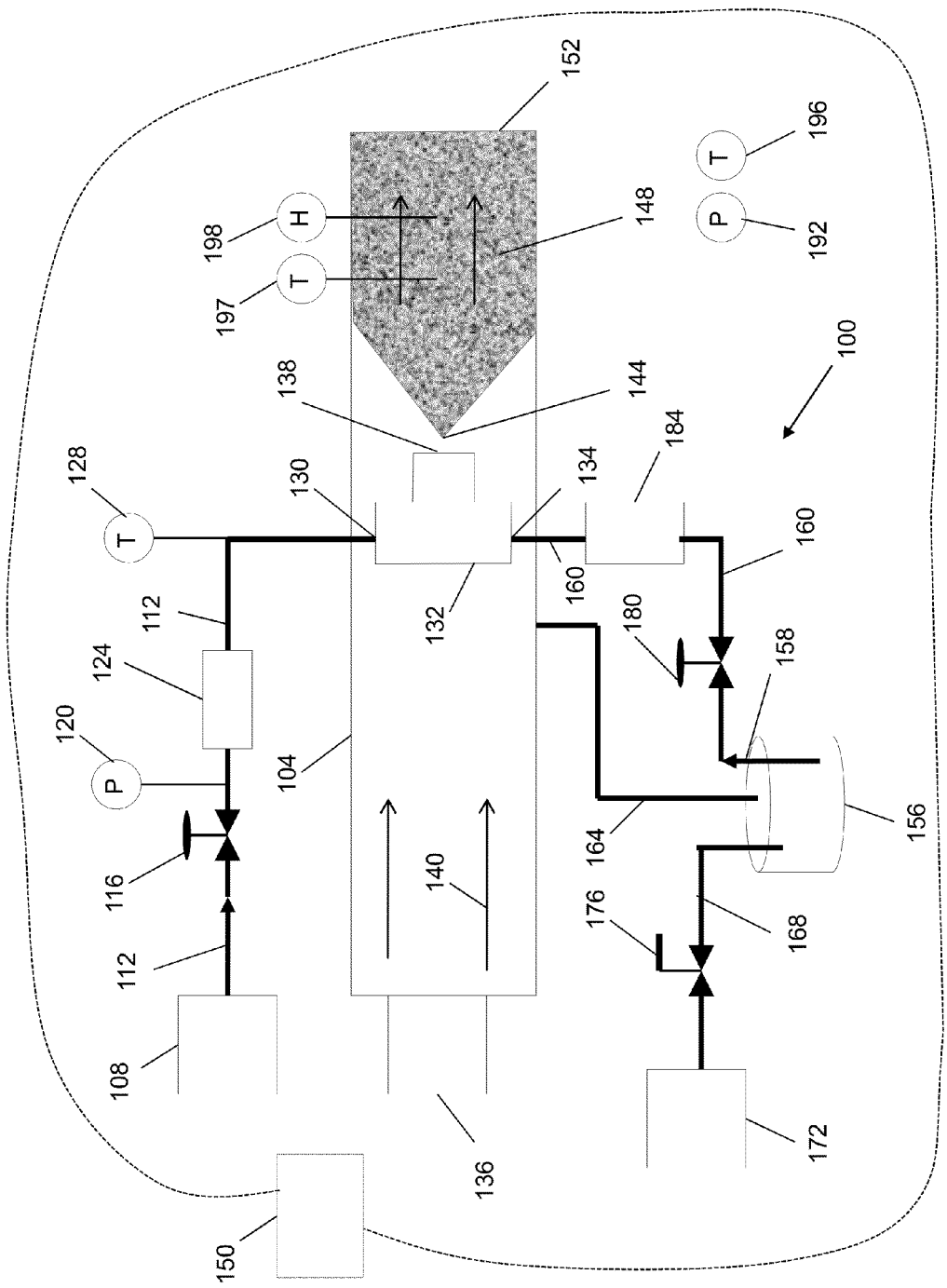
FIG. 1 is a schematic illustration of a humidity generator, according to an illustrative embodiment.

FIG. 1 is a schematic illustration of a humidity generator 100, according to an illustrative embodiment. Various operating parameters of the humidity generator 100 (e.g., water and air flow parameters) are controlled in accordance with the methods of FIG. 2 to controllably generate humidity levels below 100% and greater than 100%, with a wide range of moisture content and over a wide range of temperatures.

The humidity generator 100 includes a chamber 104 in which the humidified air is generated at various moisture content levels and temperatures. The humidity generator 100 also includes a first temperature controlled air supply 136 coupled to the chamber 104. The first air supply 136 provides a first air flow 140 to the chamber 104. The humidity generator 100 also includes an atomizing nozzle 132 in the chamber 104. The atomizing nozzle 132 generates a mist of water 144 that is emitted from a first output 138 of the atomizing nozzle 132. The atomizing nozzle 132 provides the mist of water 144 to the first air flow 140 to generate the desired humidity conditions in the output air flow 148. The output air flow 148 is then delivered to an environmental chamber (not shown) coupled to an output 152 of the chamber 104.

The humidity generator 100 also includes a second air supply 108 for providing an airflow to a first input 130 of the atomizing nozzle 132 of the chamber 104 via a supply line 112. The humidity generator 100 also includes a water supply/water storage tank 156 that includes a first output 158 coupled to a second input 134 of the atomizing nozzle 132. The first output 158 of the storage tank 156 provides water to the second input 134 of the atomizing nozzle 132 via line 160. The atomizing nozzle 132 generates the mist of water 144 using the airflow supplied by the second air supply 108 and the water supply supplied by the water storage tank 156.

The supply line 112 of the second air supply 108 includes a valve 116 to control the flow of air from the second air supply 108 to the first input 130 of the atomizing nozzle 132. The valve 116 may be, for example, a manual flow control valve controlled by an operator or an automatic flow control valve controlled by a computer processor (e.g., optional processor 150 coupled to each of the sensors, actuators, valves, air and water supplies). The humidity generator 100 also includes a pressure transducer 120 for measuring the pressure of the supply air in the supply line 112, a mass flow meter 124 for measuring the mass flow rate of the supply air through the supply line 112, and a temperature transducer 128 for measuring the temperature of the supply air in the supply line 112. The processor 150 is configured to, for example, execute computer executable instructions or a computer program to perform functions of the invention by operating on data received from the humidity generator Processors suitable for the execution of a computer program include, by way of example, both general and special purpose microprocessors, and any one or more processors of any kind of digital computer. Generally, a processor receives instructions and data from a read-only memory or a random access memory or both.

The humidity generator 100 also includes several fluid lines 160, 164, and 168. Supply line 160 is coupled to the first output 158 of the water storage tank 156 and the second input 134 of the atomizing nozzle 132. Supply line 160 provides water to the second input 134 of the atomizing nozzle 132. The supply line 160 includes a valve 180 (e.g., a manually or automatically controlled needle valve) and a rotameter 184 to control the flow of water from the water storage tank 156 to the atomizing nozzle 132. The rotameter 184 measures the flow of water through the supply line 160. An operator or computer processor controls the valve 180 to regulate the flow of water to the atomizer nozzle 132 based on the flow measured by the rotameter 184. In one embodiment, the rotameter 184 has a flow measurement range of 2.5 ml/min to 26 ml/min.

Line 164 is coupled to the chamber 104 and the water storage tank 156. The flow rate of the water supplied by the water storage tank 156 is a sensitive function of the system back-pressure difference. Line 164 is used as a pressure equalizing line to minimize the back-pressure difference between the water supplied to the atomizing nozzle 132 and the water in the water storage tank 156. In this embodiment, the water storage tank 156 is mounted at an elevation (relative to the chamber) equal or slightly above the entry point (i.e., second input 134) of the atomizing nozzle 132. The water storage tank 156 also includes a water supply 172 that resupplies water to the water storage tank 156 via line 168 as the water is consumed by the humidity generator 100. Refill valve 176 (e.g., a manually or automatically controlled valve) controls the flow of water from the water supply 172 to the water storage tank 156.

FIG. 2 is a flowchart 200 of a method for determining operating parameters for a humidity generator to generate humidity levels in an airflow, according to an illustrative embodiment. The method includes determining the target density of the output airflow 204 (e.g., output airflow 148 of FIG. 1) based on the target output airflow temperature 212 and the target output airflow pressure 216. In one embodiment, the target density of the output airflow is determined (assuming air is a perfect gas) in accordance with:

$$\text{Density} = \frac{P/14.7 * M}{(T + 459.7) * R} \quad \text{EQN. 1}$$

where, Density is in units of pounds per cubic foot, P is the target output airflow pressure 216 in units of PSI, M is the molecular weight of air (i.e., 28.84 pounds per pound-mol), T is the target output airflow temperature 212 in units of ° F., R is the gas constant (i.e., 0.73 $ft^3$*ATM/(pound*pound-mol*Rankine). The target output airflow temperature 212 and the target output airflow pressure 216 can be set for the particular application by, for example, an operator of the humidity generator. In some embodiments, the molecular weight of air is calculated rather than using the above constant (28.84 pounds per pound-mil). In some embodiments, the molecular weight of air is calculated based on the target moisture content for the output airflow. However, because the molecular weight does not vary substantially, it is often appropriate to use the above constant.

The method also includes determining the target relative humidity 220 of the output airflow 204 necessary to achieve the target moisture content for the output airflow 204 based on the atmospheric pressure 224 and ambient temperature outside 228 the humidity chamber (e.g., measured by pressure transducer 192 and temperature transducer 196 of FIG. 1) and the target density of the output airflow 204 (Density from step 204). The atmospheric pressure 224 is in units of PSI. The ambient temperature outside 228 the humidity chamber is in units of ° F. The target relative humidity 220 is expressed as a percentage. In one embodiment, target relative humidity 220 is determined using steam tables. Steam tables are compilations of thermodynamic data for water/steam. The tables are complications of possible combinations of temperature, pressure and moisture content for water/steam. The tables are used to design and operate equipment where thermodynamic cycles involving steam are used. The target relative humidity is determined using the steam tables in an iterative solution process. The target relative humidity is selected and the step (step 220) involves searching through the data in the table to identify an entry in the table that matches the target moisture content, temperature and pressure for the output airflow 204.

The method also includes determining the amount of water to be provided 232 to the atomizing nozzle of the humidity generator (e.g., water supplied by water storage tank 156 to the second input 134 of the atomizing nozzle 132 of FIG. 1). The amount of water to be provided 232 is determined based on 1) the target moisture content for the output airflow 208, 2) target flow rate for the output airflow 236, 3) the target relative humidity of the output airflow 220, and 4) relative humidity of incoming air to the humidity generator 240. In one embodiment, the amount of water to be provided 232 to the atomizing nozzle is determined in accordance with:

$$\text{Water} = \frac{(\text{Grains}/7000) * \text{AirFlow} * (\text{RHout} - \text{RHin})}{\text{RHout}} \quad \text{EQN. 2}$$

where, Water is the amount of water in units of lb/min, Grains is the target moisture content for the output airflow 208 in units of grains per pound, AirFlow is target flow rate for the output airflow 236 in units of pounds/minute, RHout is the target relative humidity of the output airflow 220 expressed as a percentage, and RHin is the relative humidity of incoming air to the humidity generator 240 expressed as a percentage.

The method also includes determining the enthalpy required to evaporate water at the target output airflow temperature 242, which is determined based on the target output airflow temperature 212. Enthalpy required to evaporate water at the target output airflow temperature 242 has units of energy per weight of water (typically in units of energy per pound) and is typically determined with reference to standardized table (e.g., Keenan et al. Steam Tables (English Units), Table 1, Saturation: Temperature, Wiley, 1969, incorporated herein in its entirety). For example, the following table lists the enthalpy required for several target output airflow temperatures:

TABLE A

Exemplary Enthalpy

| Target output airflow temperature in ° F. (° C.) | Enthalpy in BTU/lb (kJoules/N) |
|---|---|
| 35° F. (1.7° C.) | 1073.7 BTU/lb (255.5 kJoules/N) |
| 120° F. (48.9° C.) | 1025.5 BTU/lb (243.4 kJoules/N) |
| 147° F. (63.9° C.) | 1009.9 BTU/lb (239.7 kJoules/N) |

The method also includes determining the power required to evaporate the water 244 based on the enthalpy (Enthalpy is determined in step 242) in accordance with, for example:

$$\text{Power} = \frac{\text{WaterFlowRate} * \text{Enthalpy} * 100}{\text{RHout}} \quad \text{EQN. 3}$$

where WaterFlowRate is the amount of water to be provided to the atomizing nozzle 232 in units of pounds/minute.

The method also includes determining the heat required to achieve the target output airflow temperature 248 based on 1) the target output airflow temperature (from 212), 2) the temperature of the supply air to the humidity generator 252, 3) target volumetric flow rate 256, and 4) heat capacity of air 260 in accordance with:

$$\text{Heat} = (T_{out} - T_{in}) * \text{AirFlow} * \text{HeatCapacity} \quad \text{EQN. 4}$$

where, Heat is the heat required to achieve the target output airflow temperature in units of BTU/min, $T_{out}$ is the target output airflow temperature in ° F., $T_{in}$ is the temperature of the supply air to the humidity generator in ° F., and HeatCapacity is the heat capacity of air. In one embodiment, for the temperature range of 35° F. to 147° F. the HeatCapacity is assumed to be a constant (e.g., 0.241 BTU/lb).

The method also includes determining the total heat required 264 (HeatRequired) to evaporate the water supplied to the atomizing nozzle and heat the air supplied to the atomizing nozzle (in units of BTU/min) based on 1) the heat required to achieve the target output airflow temperature (from step 248) and 2) the power required to evaporate the water based on the enthalpy (from step 244). In one embodiment, the total heat required is the sum of the heat required to achieve the target output airflow temperature (from step 248) and 2) the power required to evaporate the water based on the enthalpy (from step 244).

The method also includes determining the target atomizer air temperature for air provided to the atomizer nozzle 268 of the humidity generator based on 1) the total heat required (from step 264), 2) target flow rate for the output airflow (from step 236), 3) the heat capacity of air (HeatCapacity from 260), and 4) the temperature of the supply air to the humidity generator (from 252) in accordance with:

$$\text{Temp} = \frac{\text{HeatRequired}}{\text{AirFlow} * \text{HeatCapacity}} + \text{AirTemp} \quad \text{EQN. 5}$$

where, HeatRequired is the total heat required (from 264).

The method also includes determining the target air pressure to be supplied to the atomizer nozzle 272 based on the target flow rate for the output airflow (from 236). In general, the target air pressure supplied to the atomizer nozzle is determined based on the flow performance of the atomizer nozzle for specific operating conditions. The specific operating characteristics can be determined by, for example, experimental testing of the nozzle under various output airflow rates and water supply pressures.

Figure 2:
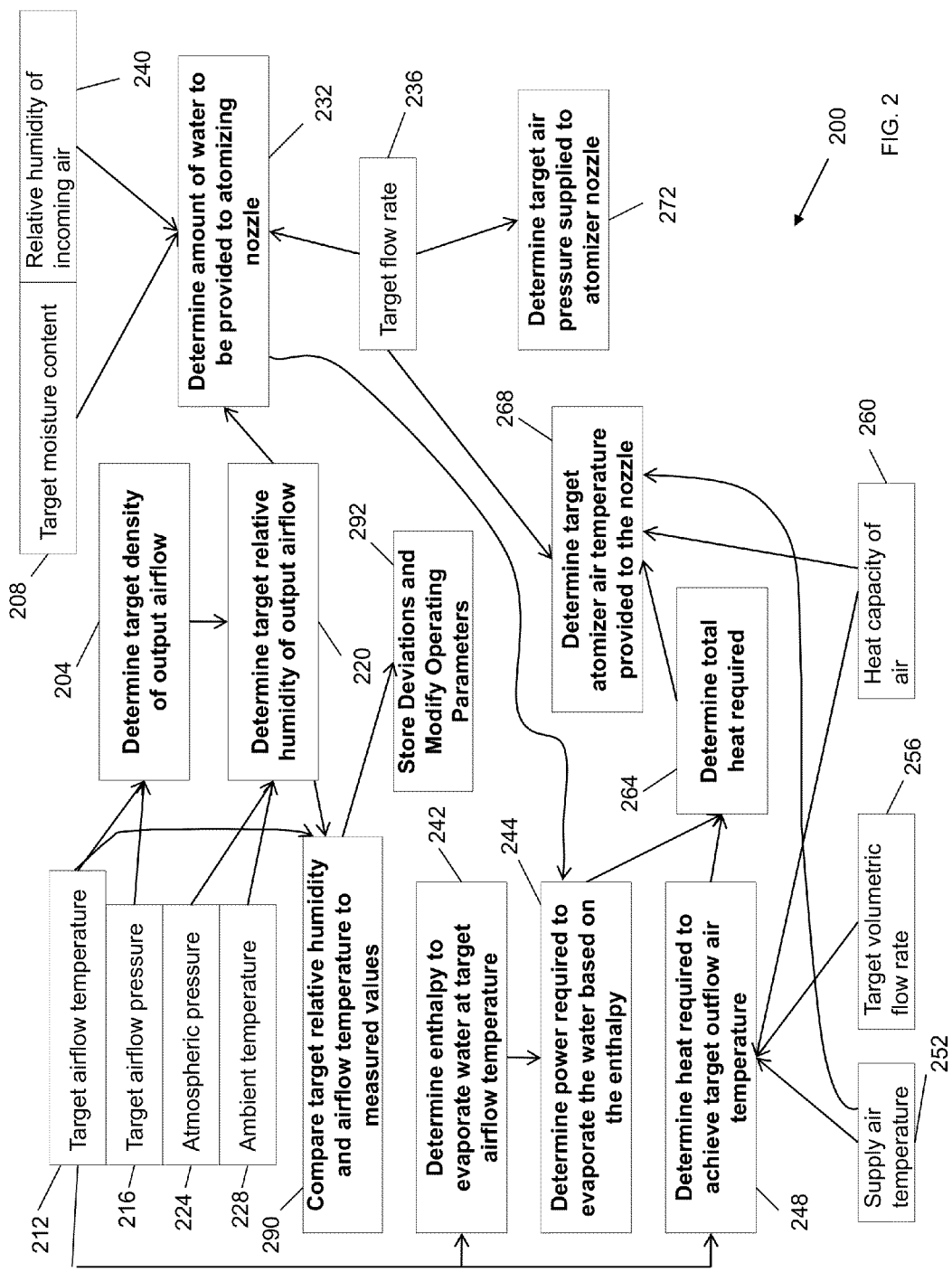
FIG. 2 is a flowchart of a method for determining operating parameters for a humidity generator to generate humidity levels in an airflow, according to an illustrative embodiment.

Referring to FIGS. 1 and 2, in some embodiments, the method also includes comparing (step 290) the predicted target relative humidity and target temperature of output airflow for humidity levels less than 100% with the actual target humidity as measured by humidity sensor 197 and target temperature as measured by temperature sensor 198 at the output 152 of chamber 104. Any deviations from predicted behavior can be stored in, for example, a computer storage device or controller memory (coupled to, for example, processor 150), to subsequently make fine adjustments to/modify the operating conditions when the target humidity is over 100% (step 292).

Figure 3:
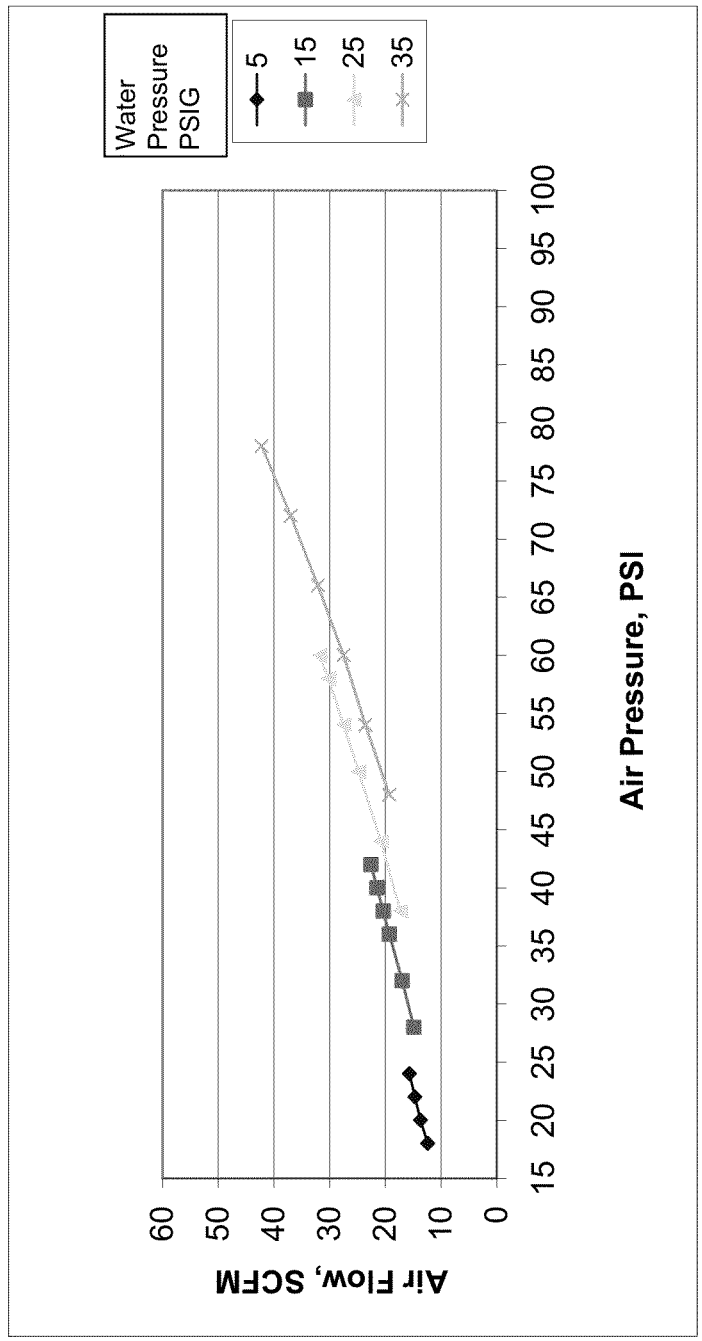
FIG. 3 is a plot of air flow versus air pressure for various water pressure amounts supplied to an exemplary atomizing nozzle.

One exemplary atomizing nozzle has the operating characteristics shown in plot 300 of FIG. 3. The Y-Axis of plot 300 is the air flow provided to the atomizing nozzle in units of standard cubic feet per minute (SCFM). The X-axis of plot 300 is the pressure of the air flow provided to the atomizing nozzle in units of PSI. The plot includes four curves for four different water pressure values for water supplied to the atomizing nozzle (5, 15, 25, and 35 pound force per square inch gauge (PSIG)).

Experiments were conducted using the method of FIG. 2. The table below provides the values determined in the experiments using the flowchart of FIG. 2 for determining operating parameters for a humidity generator to generate humidity levels in an airflow. Condition 1 creates an output relative humidity of 256% and condition 2 creates an output relative humidity of 30.6%.

TABLE 1

| | | Condition 1 | Condition 2 |
|---|---|---|---|
| Desired Outlet Temperature, F. | | 35 | 120 |
| Grains of Water | | 78 | 154 |
| Air Flow Rate | Pounds per minute | 1.14 | 2.62 |
| | Density gm per liter | 1.2774131 | 1.091051 |
| Air Flow Rate, SCFM | | 14.295335 | 38.466006 |
| Inlet RH | | 0 | 0 |
| Outlet RH | | 256 | 30.6 |
| Water flow | pounds per minute | 0.0127029 | 0.05764 |
| | ml/min | 5.761889 | 26.144928 |
| Water Flow Gallons per Hour | gallons per hour | 0.0892163 | 0.4048247 |
| | Air Inlet Temp, T | 70 | 70 |
| Evaporation Enthalpy BTU/lb | | 1073.7 | 1025.5 |
| Evaporation Power, BTU per Min | | 5.3277569 | 59.10982 |
| Air Heating, BTU/lb | | 0.241 | 0.241 |
| Air Heating Power, BTU/Min | | −9.6159 | 31.571 |
| Total Heating Power BTU/Min | | −4.2881431 | 90.68082 |
| Total Heating Power Watts | | −75.399849 | 1594.4711 |
| Heater Temperature, Deg F. | | 54.391996 | 213.61411 |
| Factors using SU72 Nozzle | | | |
| Approx Air Pressure, PSIG | | 21 | 74 |

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method, executed by one or more processors, for determining operating parameters for a humidity generator to generate humidity levels in an airflow, the method comprising:
    determining target density of an output airflow based on target output airflow temperature and target output airflow pressure;
    determining target relative humidity of the output airflow to achieve the target moisture content for the output airflow based on atmospheric pressure and ambient temperature outside the humidity chamber, and target density of the output airflow;
    determining an amount of water to be provided to an atomizing nozzle of the humidity generator based on 1) target moisture content for the output airflow, 2) target flow rate for the output airflow, 3) the target relative humidity of the output airflow, and 4) relative humidity of incoming air to the humidity generator;
    determining enthalpy required to evaporate water at the target output airflow temperature;
    determining power required to evaporate the water based on the enthalpy;
    determining heat required to achieve the target output airflow temperature based on 1) the target output airflow temperature, 2) the temperature of the supply air to the humidity generator; 3) target volumetric flow rate, and 4) heat capacity of air;
    determining total heat required based on 1) the heat required to achieve the target output airflow temperature and 2) the power required to evaporate the water based on the enthalpy;
    determining target atomizer nozzle air temperature for air provided to the atomizer nozzle of the humidity generator based on 1) the total heat required, 2) target flow rate for the output airflow, 3) the heat capacity of air, and 4) the temperature of the supply air to the humidity generator; and
    determining target air pressure to be supplied to the atomizer nozzle based on the target flow rate for the output airflow.

2. The method of claim 1, comprising heating or cooling the nozzle air prior to entering the atomizer nozzle of the humidity generator to the target atomizer nozzle air temperature.

3. The method of claim 1, comprising, by the one or more processors, specifying:
    the target moisture content for the output airflow,
    the target temperature for an output airflow,
    the target flow rate for the output airflow,
    the relative humidity of incoming air to the humidity generator, and
    the temperature of the incoming air to the humidity generator.

4. The method of claim 1, generating humidity levels greater than 100% in the airflow.

5. The method of claim 1, generating humidity levels less than 100% in the airflow.

6. The method of claim 5, comprising, by the one or more processors, calibrating operation of the humidity generator based on a humidity signal measured during operation at conditions less than 100% humidity to improve accuracy during operation at conditions above 100% humidity.

7. A humidity generator for generating humidity levels in an airflow, the humidity generator comprising:
a chamber;
a first air supply for providing an airflow to the chamber;
an atomizing nozzle in the chamber comprising first and second inputs;
a second air supply comprising an output coupled to the first input of the atomizing nozzle;
a water storage tank comprising a first output coupled to the second input of the atomizing nozzle, and a second output coupled to the chamber for equalizing pressure between the chamber and the water storage tank; and
a control module to vary output properties of the first air supply, second air supply, and the water storage tank, wherein the control module includes a processor including a computer program product that includes instructions being operable to:
determine target density of an output airflow based on a target output airflow temperature and target output airflow pressure;
determine target relative humidity of the output airflow to achieve the target moisture content for the output airflow based on atmospheric pressure and ambient temperature outside the humidity chamber, and target density of the output airflow;
determine an amount of water to be provided to an atomizing nozzle of the humidity generator from the water storage tank based on 1) target moisture content for the output airflow, 2) target flow rate for the output airflow, 3) the target relative humidity of the output airflow, and 4) relative humidity of incoming air to the humidity generator;
determine enthalpy required to evaporate water at the target output airflow temperature;
determine power required to evaporate the water based on the enthalpy;
determine heat required to achieve the target output airflow temperature based on 1) the target output airflow temperature, 2) the temperature of the supply air to the humidity generator; 3) target volumetric flow rate, and 4) heat capacity of air;
determine total heat required based on 1) the heat required to achieve the target output airflow temperature and 2) the power required to evaporate the water based on the enthalpy;
determine target atomizer nozzle air temperature for air provided to the atomizer nozzle of the humidity generator based on 1) the total heat required, 2) target flow rate for the output airflow, 3) the heat capacity of air, and 4) the temperature of the supply air to the humidity generator; and
determine target air pressure to be supplied to the atomizer nozzle based on the target flow rate for the output airflow.

8. The humidity generator of claim 7, wherein the water storage tank is configured to store deionized water, distilled water, or a combination of both.

9. The humidity generator of claim 7, wherein the control module is configured to generate humidity levels greater than 100% in the airflow.

10. The humidity generator of claim 7, wherein the control module is configured to generate humidity levels less than 100% in the airflow.

11. The humidity generator of claim 10, comprising a humidity sensor that generates a humidity signal measured during operation at conditions less than 100% humidity, wherein the humidity sensor provide provides the humidity signal to the control module to improve accuracy during operation at conditions above 100% humidity.

* * * * *